United States Patent
Lee

(10) Patent No.: US 10,511,821 B2
(45) Date of Patent: *Dec. 17, 2019

(54) METHOD AND APPARATUS FOR CONTROLLING WHITE BALANCE

(71) Applicant: Samsung Electronics Co., Ltd., Gyeonggi-do (KR)

(72) Inventor: Yong-Gu Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,971

(22) Filed: Dec. 21, 2018

(65) Prior Publication Data

US 2019/0149791 A1    May 16, 2019

Related U.S. Application Data

(63) Continuation of application No. 15/664,035, filed on Jul. 31, 2017, now Pat. No. 10,165,244, which is a continuation of application No. 14/944,396, filed on Nov. 18, 2015, now Pat. No. 9,723,284.

(30) Foreign Application Priority Data

Dec. 4, 2014    (KR) .................. 10-2014-0173261

(51) Int. Cl.
| | | |
|---|---|---|
| *H04N 9/73* | (2006.01) | |
| *H04N 5/33* | (2006.01) | |
| *H04N 5/225* | (2006.01) | |

(52) U.S. Cl.
CPC .......... *H04N 9/735* (2013.01); *H04N 5/2256* (2013.01); *H04N 5/2258* (2013.01); *H04N 5/332* (2013.01)

(58) Field of Classification Search
CPC ...... H04N 9/735; H04N 5/332; H04N 5/2256; H04N 5/2258
See application file for complete search history.

(56) References Cited

U.S. PATENT DOCUMENTS

| | | | |
|---|---|---|---|
| 5,099,313 | A | 3/1992 | Suemoto et al. |
| 8,416,303 | B2 | 4/2013 | Gomi |
| 2003/0058350 | A1 | 3/2003 | Ishimaru et al. |
| 2003/0058357 | A1 | 3/2003 | Aotsuka |
| 2007/0145273 | A1 | 6/2007 | Chang |
| 2012/0025080 | A1 | 2/2012 | Liu et al. |
| 2012/0026339 | A1 | 2/2012 | Kojima et al. |
| 2013/0093929 | A1 | 4/2013 | Kouyama et al. |
| 2013/0105668 | A1 | 5/2013 | Ho et al. |
| 2013/0155274 | A1 | 6/2013 | Yoshino et al. |
| 2013/0201200 | A1 | 8/2013 | Mendez Alcazar |
| 2015/0326840 | A1 | 11/2015 | Usui et al. |

FOREIGN PATENT DOCUMENTS

| | | |
|---|---|---|
| JP | 2002-374539 A | 12/2002 |
| JP | 2010-161455 A | 7/2010 |

*Primary Examiner* — David P Porta
*Assistant Examiner* — Fani Boosalis
(74) *Attorney, Agent, or Firm* — Cha & Reiter, LLC.

(57) ABSTRACT

A method comprising: capturing, by an electronic device, a first incident light sample and generating an image based on the first incident light sample; capturing, by the electronic device, a second incident light sample and identifying a light source type associated with the second incident light sample; and adjusting a white balance of the image according to the light source type.

18 Claims, 14 Drawing Sheets

GAIN ADJUSTMENT TABLE (700)

| COLOR TEMPERATURE(k) | LIGHT SOURCE TYPE | AWB GAIN CONTROL VALUE |
|---|---|---|
| 7000 | Daylight color fluorescent lamp or mercury lamp | R=2.292, G=1, B=1.343 |
| 6500 | D65 light source (Average Daylight) | R=2.203, G=1, B=1.370 |
| 5000 | D50 light source | R=1.853, G=1, B=1.562 |
| 4000 | White color fluorescent lamp, silver white fluorescent lamp, or halogen lamp | R=1.563, G=1, B=1.770 |
| 3300 | Silver white fluorescent lamp or high temperature sodium lamp | R=1.351, G=1, B=2.083 |
| 2300 | Horizontal sun light | R=1.136, G=1, B=2.778 |

FIG.7

METHOD AND APPARATUS FOR CONTROLLING WHITE BALANCE

CROSS REFERENCE TO RELATED APPLICATIONS

This application is a Continuation of U.S. patent application Ser. No. 15/664,035 filed on Jul. 31, 2017 which is a Continuation of the earlier U.S. patent application Ser. No. 14/944,396 filed on Nov. 18, 2015 and assigned U.S. Pat. No. 9,723,284 issued on Aug. 1, 2017 which claims priority under 35 U.S.C. § 119(a) to Korean Application Serial No. 10-2014-0173261, which was filed in the Korean Intellectual Property Office on Dec. 4, 2014, the entire content of which is hereby incorporated by reference.

TECHNICAL FIELD

The present disclosure relates to electronic devices in general, and more particularly to a method and apparatus for controlling white balance.

BACKGROUND

Various types of electronic devices such as a smartphone, a tablet PC, and the like are widely used, and the electronic device may include a camera function. For example, a display such as a touch screen may be installed on the front side of the electronic device such as the smartphone or the like. A first camera may be installed on the front side, which is the same direction of the display, and a second camera may be installed on the rear side which is an opposite direction of the display.

The first camera may be referred to as a front camera and the second camera may be referred to as a rear camera. At least one of the first camera and the second camera may perform an Auto White Balance (AWB) function. The AWB function is one of the auto correction functions of the camera to photograph a white subject as a white image regardless of various types of light sources such as the light of the sun, the incandescent light, the fluorescent light, and the like.

SUMMARY

Various embodiments of the present disclosure provide a method of controlling white balance, which can further improve an Auto White Balance (AWB) function by using a Sensor of Light Classification (SLC) for classifying incident lights into a visible light and an infrared light by various types of electronic devices such as a smartphone, a tablet PC, a digital camera, and the like, and an electronic device thereof.

In accordance with an aspect of the present disclosure, a method is provided comprising: capturing, by an electronic device, a first incident light sample and generating an image based on the first incident light sample; capturing, by the electronic device, a second incident light sample and identifying a light source type associated with the second incident light sample; and adjusting a white balance of the image according to the light source type.

In accordance with another aspect of the present disclosure, an electronic device is provided comprising: an image sensor; a sensor for light classification (CLS); and at least one processor configured to: capture, with the image sensor, a first incident light sample and generate an image based on the first incident light sample; capture, with the CLS, a second incident light sample and identifying a light source type associated with the second incident light sample; and modify a white balance of the image according to the light source type.

In accordance with yet another aspect of the disclosure, a non-transitory computer-readable storage medium is provided that stores one or more processor-executable instructions, which when executed by at least one processor cause the processor to perform a method comprising: capturing, by an electronic device, a first incident light sample and generating an image based on the first incident light sample; capturing, by the electronic device, a second incident light sample and identifying a light source type associated with the second incident light sample; and modify a white balance of the image according to the light source type.

According to various embodiments of the present disclosure, for example, when various types of electronic devices such as a smartphone, a tablet PC, and the like perform a camera photography operation, the electronic device determines a current light source type by using a sensor of light classification and performs a white balance control operation optimal for the light source type. Accordingly, when a single color subject is photographed by a camera, the electronic device may prevent in advance a white balance error phenomenon (for example, a bluish phenomenon) such as a case where an original subject color is misjudged as a light source color and thus the subject color is processed to be a complementary color different from the original color.

BRIEF DESCRIPTION OF THE DRAWINGS

The above and other aspects, features, and advantages of the present disclosure will be more apparent from the following detailed description taken in conjunction with the accompanying drawings, in which:

FIG. 7 is a diagram of an example of a gain adjustment table, according to various embodiments of the present disclosure;

DETAILED DESCRIPTION

Hereinafter, various embodiments of the present disclosure will be described with reference to the accompanying drawings. It is apparent to those skilled in the art that various embodiments of the present disclosure may be variously modified and are not limited to particular embodiments described below in detail.

Figure 1A:
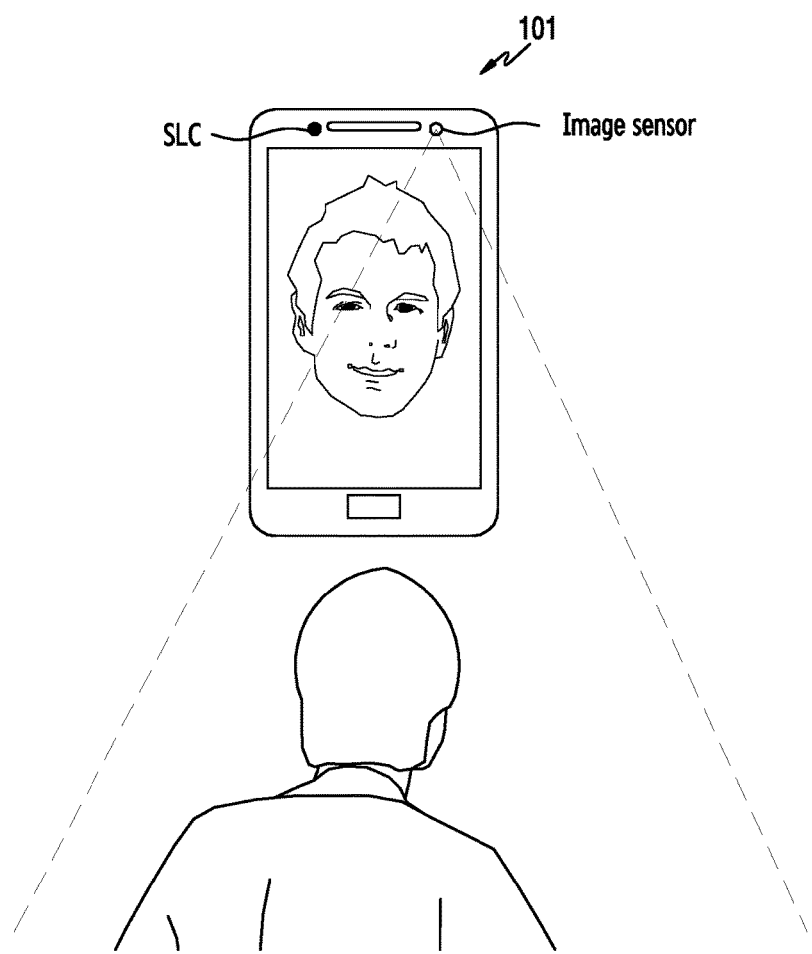
FIG. 1A illustrates an example of an electronic device, according to various embodiments of the present disclosure.

FIG. 1A illustrates an example of an electronic device according to various embodiments of the present disclosure. Referring to FIG. 1A, an electronic device 101 may be one of various types of electronic devices such as a smartphone, a tablet PC, a digital camera, and the like. The electronic device 101 may include a camera module for photographing an image and a sensor of light classification for detecting a type of an ambient light source which are installed on the front surface of the electronic device 101 or in surfaces opposite to each other. For example, a first image sensor and a first sensor of light classification may be installed on the front surface of the electronic device 101 and a second image sensor and a second sensor of light classification may be installed on the rear surface of the electronic device 101.

Figure 1B:
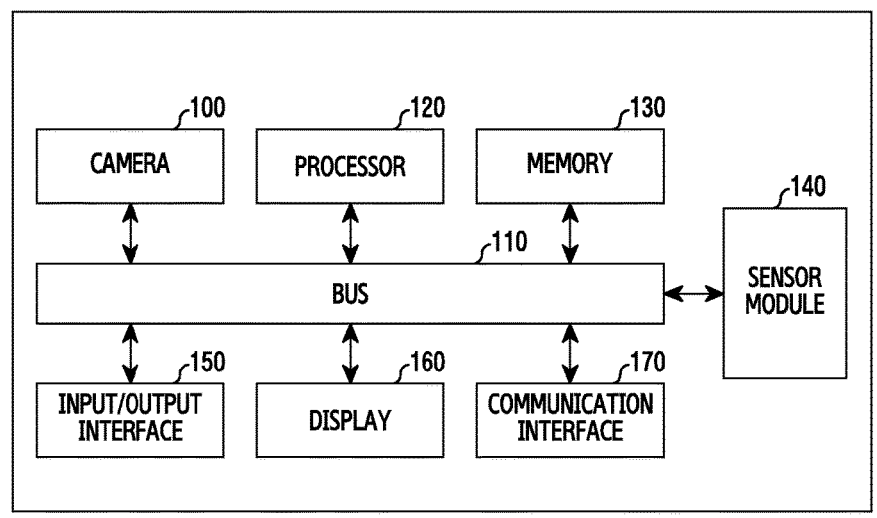
FIG. 1B is a block diagram of an example of an electronic device, according to various embodiments of the present disclosure.

FIG. 1B is a block diagram of an example of an electronic device, according to various embodiments of the present disclosure. Referring to FIG. 1B, the electronic device 101 may include a camera 100, a bus 110, a processor 120, a memory 130, a sensor module 140, an input/output interface 150, a display 160, and a communication interface 170.

The camera 100 may include a first camera module installed on the front surface, which corresponds to the same direction as the display 160, and a second camera module installed on the rear surface, which corresponds to an opposite direction of the first camera module, or include only one of the first camera module and the second camera module. The bus 110 may include a circuit for connecting the components to each other and transferring communication messages or data between the components.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. Additionally or alternatively, the processor 120 may include one or more of a Central Processing Unit (CPU), an Application Processor (AP), and a Communication Processor (CP), and control at least one component of the electronic device 101, perform calculations related to communication, or process data.

The memory 130 may include any suitable type of volatile or non-volatile memory, such as Random Access Memory (RAM), Read-Only Memory (ROM), Network Accessible Storage (NAS), cloud storage, a Solid State Drive (SSD), etc. The memory 130 may store commands or data related to at least one other component of the electronic device 101 and software and/or programs. The program may include, for example, a kernel, middleware, an Application Programming Interface (API), and an application program.

The sensor module 140 may include, for example, a proximity sensor for detecting whether a user or an object is in proximity to the electronic device by using an infrared light, an illumination sensor for detecting whether ambient illumination changes based on a visible light, and other various types of sensors. The proximity sensor and the illumination sensor may be manufactured as one integrated small sensor module. The input/output interface 150 may serve as, for example, an interface which can transmit commands or data input from the user or another external electronic device to other components of the electronic device 101.

The display 160 may be various types of displays such as, for example, a Liquid Crystal Display (LCD), a Light Emitting Diode (LED) display, and an Organic LED (OLED) display. The display 160 may include a touch screen and receive a touch input, a gesture input, a proximity input, or a hovering input through an electronic pen or a user's body part.

The communication interface 170 may enable communication between the electronic device 101 and external electronic devices. For example, the electronic device 101 may communicate with the external electronic devices through wireless communication or wired communication. The wireless communication may include at least one of, for example, LTE, LTE-A, CDMA, WCDMA, UMTS, WiBro, and GSM, and the wired communication may include at least one of, for example, Universal Serial Bus (USB), High Definition Multimedia Interface (HDMI), Recommended Standard 232 (RS-232), and Plain Old Telephone Service (POTS).

Figure 2:
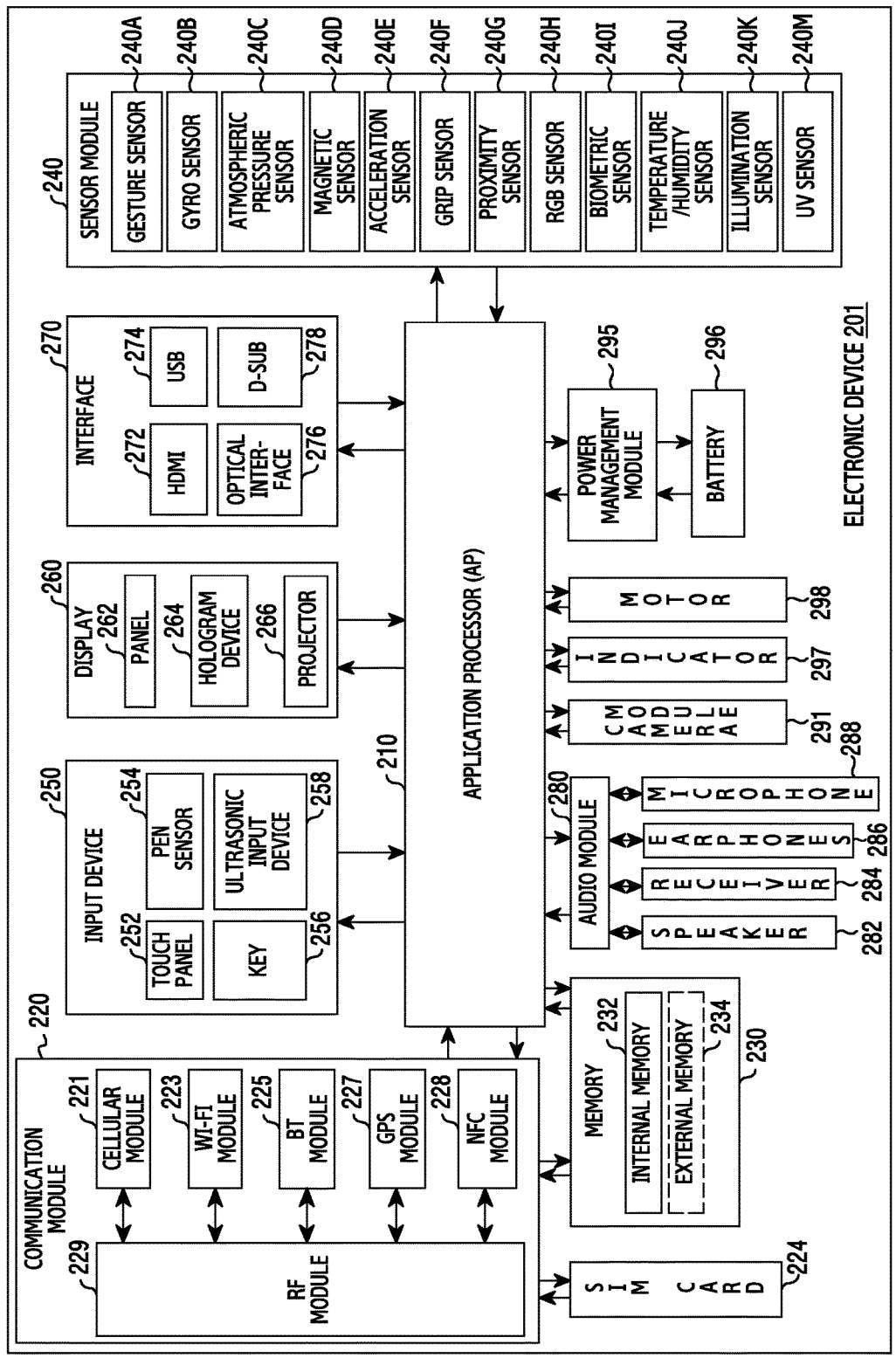
FIG. 2 is a block diagram of an example of an electronic device according to various embodiments of the present disclosure.

FIG. 2 is a block diagram of an example of an electronic device, according to various embodiments of the present disclosure. The electronic device 201 may include at least one Application Processor (AP) 210, a communication module 220, a Subscriber Identifier Module (SIM) card 224, a memory 230, a sensor module 240, an input device 250, a display 260, an interface 270, an audio module 280, a camera module 291, a power management module 295, a battery 296, an indicator 297, and/or a motor 298.

The AP 210 may drive an operating system or an application program so as to control a plurality of hardware or software components connected to the AP, and may process various pieces of data including multimedia data and perform calculations. The AP 210 may be implemented by, for example, a System on Chip (SoC). According to an embodiment, the AP 210 may further include a Graphic Processing Unit (GPU) (not illustrated).

The AP 210 may load a command or data received from at least one of a non-volatile memory and other components connected to each of the AP 210 in a volatile memory, and may process the loaded command or data. Further, the AP or the CP may store data received from or generated by at least one of the other components in a non-volatile memory.

According to an embodiment, the communication module 220 may include a cellular module 221, a Wi-Fi module 223, a BT module 225, a GPS module 227, an NFC module 228, and/or a Radio Frequency (RF) module 229.

The cellular module 221 may provide a voice, a call, a video call, a text message service, or an Internet service through a communication network (for example, Long Term Evolution (LTE), LTE-A, Code Division Multiple Access (CDMA), Wideband CDMA (WCDMA), Universal Mobile Telecommunication System (UMTS), Wireless Broadband (WiBro), or Global System for Mobile communication (GSM)). Furthermore, the cellular module 221 may distinguish between and authenticate electronic devices in a communication network by using, for example, a subscriber identification module (for example, the SIM card 224). According to an embodiment, the cellular module 221 may perform at least some of the functions that the AP 210 may provide. For example, the cellular module 221 may perform at least some of the multimedia control functions.

For example, each of the Wi-Fi module 223, the BT module 225, the GPS module 227, and the NFC module 228 may include a processor for processing data transmitted/received through the corresponding module. Although the cellular module 221, the WiFi module 223, the BT module 225, the GPS module 227, and the NFC module 228 are illustrated as separate blocks in FIG. 2, at least some (for example, two or more) of the cellular module 221, the WiFi module 223, the BT module 225, the GPS module 227, and the NFC module 228 may be included in one Integrated Chip (IC) or one IC package in one embodiment. For example, at least some (for example, the communication processor corresponding to the cellular module 221 and the WiFi processor corresponding to the WiFi module 223) of the processors corresponding to the cellular module 221, the WiFi module 223, the BT module 225, the GPS module 227, and the NFC module 228 may be implemented as one SoC.

The RF module 229 may transmit/receive data, for example, RF signals. Although not illustrated in the drawing, the RF module 229 may, for example, include a transceiver, a Power Amp Module (PAM), a frequency filter, a Low Noise Amplifier (LNA), or the like. Further, the RF module 229 may further include a component for transmitting/receiving electronic waves over a free airspace in wireless communication, for example, a conductor, a conducting wire or the like. Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module in one embodiment.

The SIM card 224 may be a card including a subscriber identification module, and may be inserted into a slot formed in a predetermined portion of the electronic device. The SIM card 224 may include unique identification information (for example, an integrated circuit card identifier (ICCID)) or subscriber information (for example, an international mobile subscriber identity (IMSI)).

The memory 230 (for example, the memory 130) may include an internal memory 232 or an external memory 234. The internal memory 232 may include at least one of a volatile memory (for example, a Dynamic Random Access Memory (DRAM), a Static RAM (SRAM), a Synchronous Dynamic RAM (SDRAM), or the like) or a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like).

The sensor module 240 measures a physical quantity or senses an operation state of the electronic device 201, and converts the measured or sensed information into an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, an RGB sensor 240H, a biometric sensor 240I, a temperature/humidity sensor 240J, an illumination sensor 240K, and an ultraviolet (UV) sensor 240M. Additionally or alternatively, the sensor module 240 may, for example, include an E-nose sensor (not shown), an electromyography (EMG) sensor (not shown), an electroencephalogram (EEG) sensor (not shown), an electrocardiogram (ECG) sensor (not shown), an Infrared (IR) sensor (not shown), an iris sensor (not shown), a fingerprint sensor (not shown), and the like. The sensor module 240 may further include a control circuit for controlling one or more sensors included therein.

The input device 250 may include a touch panel 252, a (digital) pen sensor 254, a key 256, or an ultrasonic input device 258. The touch panel 252 may detect a touch input in at least one of, for example, a capacitive type, a resistive type, an infrared type, and an acoustic wave type. The touch panel 252 may further include a control circuit. The capacitive type touch panel may detect a physical contact or proximity. The touch panel 252 may further include a tactile layer. In this case, the touch panel 252 may provide a user with a tactile reaction.

The camera module 291 may correspond to a device capable of photographing, for example, a still image and a dynamic image, and may be divided into a front camera module and a rear camera module. Each of the camera modules may include an image sensor, a lens, an Image Signal Processor (ISP), or a flash device (e.g., an LED flash, a xenon tube, a flashbulb, and/or any other suitable type of device that is capable of producing a photographic flash). In some implementations, multiple flash devices may be present in the camera module 291, such that each of the flash devices is capable of producing a different color of light, and/or light having a different color temperature.

The power management module 295 may manage the power supply of the electronic device 201. Although not illustrated, the power management module 295 may include, for example, a Power Management Integrated Circuit (PMIC), a charger Integrated Circuit (IC), or a battery or fuel gauge. According to various embodiments, the PMIC may be mounted within an integrated circuit or a SoC semiconductor. Charging methods may be classified into a wired charging method and a wireless charging method. The charger IC may charge a battery and may prevent an overvoltage or excess current from being induced or flowing from a charger.

The indicator 297 may display a specific state of the electronic device 201 or a part thereof (for example, the AP 210), for example, a boot-up state, a message state, or a state of charge (SOC). The motor 298 may convert an electrical signal into a mechanical vibration. Although not illustrated, the electronic device 201 may include a processing device (for example, a GPU) for supporting mobile TV. The processing unit for supporting mobile TV may process, for example, media data pursuant to a certain standard of Digital Multimedia Broadcasting (DMB), Digital Video Broadcasting (DVB), or media flow.

Figure 3A:
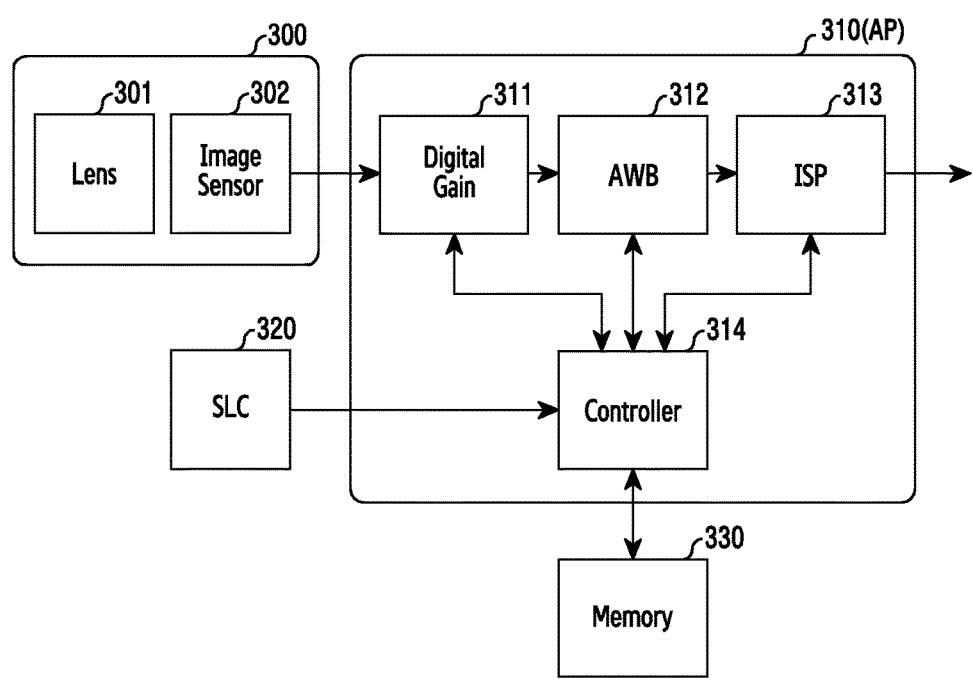
FIG. 3A is a diagram of an example of an electronic device, according to various embodiments of the present disclosure.
Figure 3B:
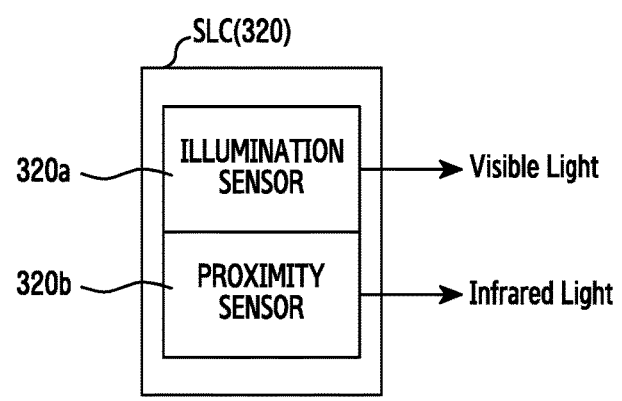
FIG. 3B is a diagram of an example of a sensor, according to various embodiments of the present disclosure is applied.

FIG. 3A is a diagram of an example of an electronic device, according to various embodiments of the present disclosure, and FIG. 3B illustrates an example of a sensor for light classification (CLS), according to various embodiments of the present disclosure. Referring to FIG. 3A, for example, various types of electronic devices such as smartphones may include at least one camera module 300 including a lens 301 and an image sensor 302. The electronic device may include an Application Processor (AP) 310 including a digital gain processor 311, an Auto White Balance processor (AWB) 312, an Image Signal Processor (ISP) 313, and a controller 314. Any of the processors 310-312 and the controller 314 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. Although in the present example the processors 310-312 and the controller 314 are depicted as discrete components, in some implementations any two or more of them may be integrated together.

The electronic device may include a Sensor for Light Classification (SLC) 320 and a memory 330, and the SLC 320 may be a component for classifying an incident light according to, for example, wavelength. The SLC 320 may include a visible light sensor for identifying the amount of visible light that is present in an incident light sample and an infrared light sensor for identifying the amount of infrared light that is present in the incident light sample. In some implementations, the incident light sample may include any suitable type of data that is simultaneously, concurrently, and/or sequentially captured by the visible light sensor and the infrared light sensor.

Referring to FIG. 3B, the SLC 320 may include, for example, an illumination sensor 320a for detecting whether ambient illumination changes and a proximity sensor 320b for detecting whether a user or an object is in proximity to the electronic device. The illumination sensor 320a may operate as the visible light sensor for measuring the amount of visible light present in an incident light sample, and the proximity sensor 320 may operate as an infrared light sensor for identifying the amount of infrared light that is present in the incident light sample. The illumination sensor 320a and the proximity sensor 320b may be manufactured as one integrated sensor module. In some instances, the integrated sensor module may be referred to as a proximity illumination sensor instead. By way of example, the image sensor 302 included in the camera module 300 (e.g., a CMOS image sensor, for converting incident light passing through the lens 301 into an image) may be used. The controller 314 of the application processor 310 may use the digital gain processor 311, the white balance processor, and the image signal processor 313, determine a type of a light source of the incident light based on the visible light and the infrared light classified by the SLC 320, and control the AWB according to the type of the light source of the incident light.

The memory 330 may store various pieces of information by which the controller 314 determines the type of the light source of the incident light and/or controls the auto white balance. The memory 330 may be included in the application processor 310 or may be a separate component. The application processor 310 may be the completely same component as the processor 120 of FIG. 1 or at least a partially similar component to the processor 120 of FIG. 1.

Figure 4A:
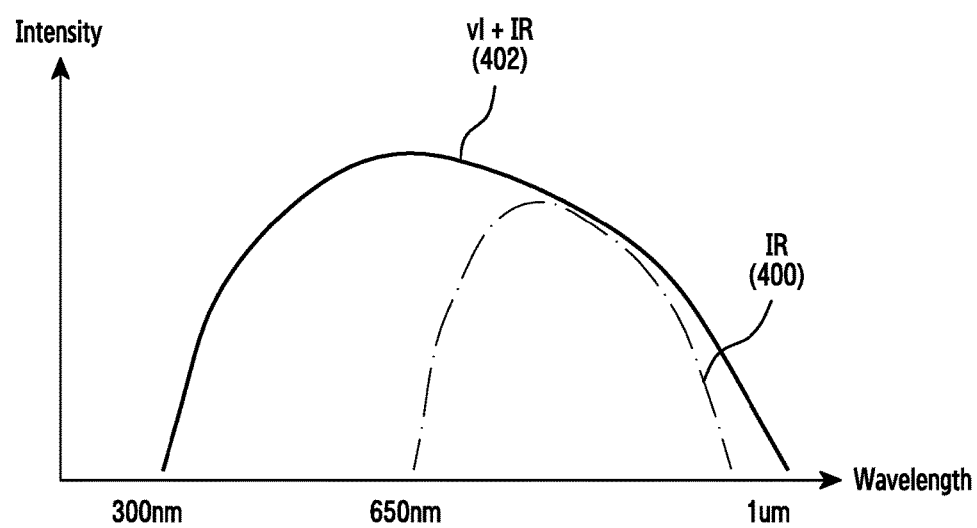
FIG. 4A is a graph of an example of the composition of light sample, according to various embodiments of the present disclosure.
Figure 4B:
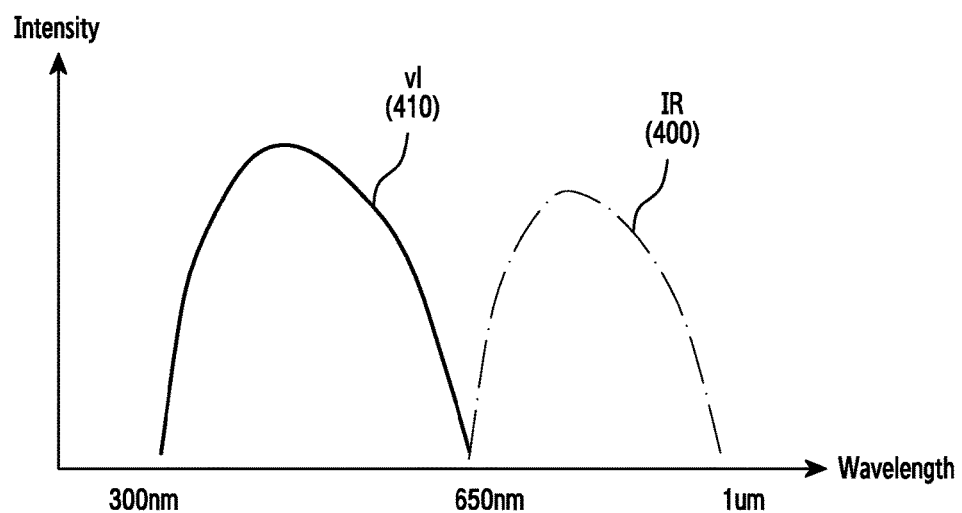
FIG. 4B is another graph of an example of the composition of light sample, according to various embodiments of the present disclosure.
Figure 4C:
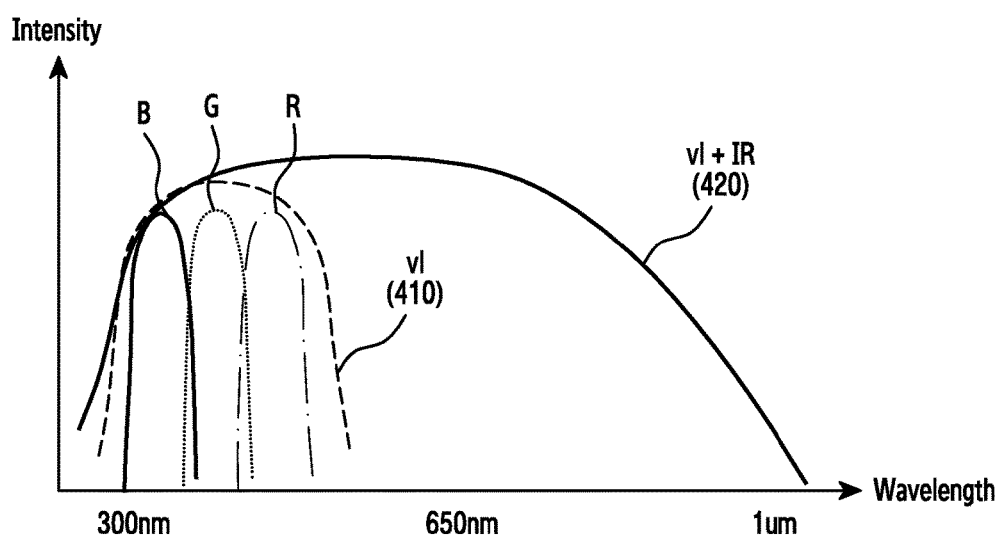
FIG. 4C is yet another graph of an example of the composition of light sample, according to various embodiments of the present disclosure.

FIGS. 4A to 4C illustrate examples of spectral characteristics of light measured by the SLC according to various embodiments of the present disclosure. As illustrated, the SLC may be used to measure the amounts of Visible Light (VL) and Infrared Light (IR) that are present in an incident light sample when an image is being captured.

For example, visible light has a wavelength ranging from 380 nm to 770 nm and is visible to the human eye. Different wavelengths of visible light are associated with different colors. For example, in a case of a single color light, 700 nm to 610 nm may be seen as red, 610 nm to 590 nm may be seen as orange, 590 nm to 570 nm may be seen as yellow, 570 nm to 500 nm may be seen green, 500 nm to 450 nm may be seen blue, and 450 nm to 400 nm may be seen as violet.

On the other hand, infrared light corresponds to an electromagnetic wave having a wavelength longer than that of red visible light. The infrared light having a range of 2.5 μm or lower may be referred to as near infrared light, the infrared light range from 2.5 μm to 25 μm may be referred to as a mid-infrared light, and the infrared light having a range of 25 μm or higher may be referred to as a far infrared light.

Referring to FIG. 4A, the SLC may detect the amount of visible light and the amount of infrared light (IR 400) in a sample of incident light that is captured by the SLC and provide the Application Processor (AP) with an indication of the sum of the amounts of visible light (VL) and infrared light (IR) that are present in the sample (e.g., the sum (VL+IR) 402). In addition, the SLC may provide the AP with an indication of the amount of infrared light (IR 400) that is present in the incident light sample (e.g., IR 400).

For example, when the SLC outputs an indication of the amount of VL that is present in the sample and an indication of the amount of IR that is present in the sample, the AP may combine the VL and the IR to generate the sum (VL+IR) 402. Alternatively, the SLC may independently calculate the sum (VL+IR) 402 and simply output an indication of the sum 402 and an indication of the amount of IR to the AP. Although in the present example, the amounts of visible light and infrared light in a sample are measured based on the total intensity of respective spectral components of the light sample that correspond to visible light and infrared light, respectively, it will be readily appreciated that any suitable type of metric that is indicative of the amount of a particular type of light in a given light sample can be used.

Referring to FIG. 4B, for example, the SLC may measure the amounts of visible light (VL 410) and infrared light (IR 400) that are present in a captured sample of incident light and output an indication of the VL 410 and IR 400 to the AP.

Referring to FIG. 4C, the SLC may include, for example, an RGB sensor (not shown) therein. A sum of R, G, and B values detected (R, G, and B) by the RGB sensor may also be used to indicate the VL 410, so that an RGB sensor including three light receiving elements R, G, and B may be used instead of another type of visible light sensor. The SLC may output the VL 410 corresponding to the RGB sum and the sum (VL+IR) 420 to the AP.

Figure 5:
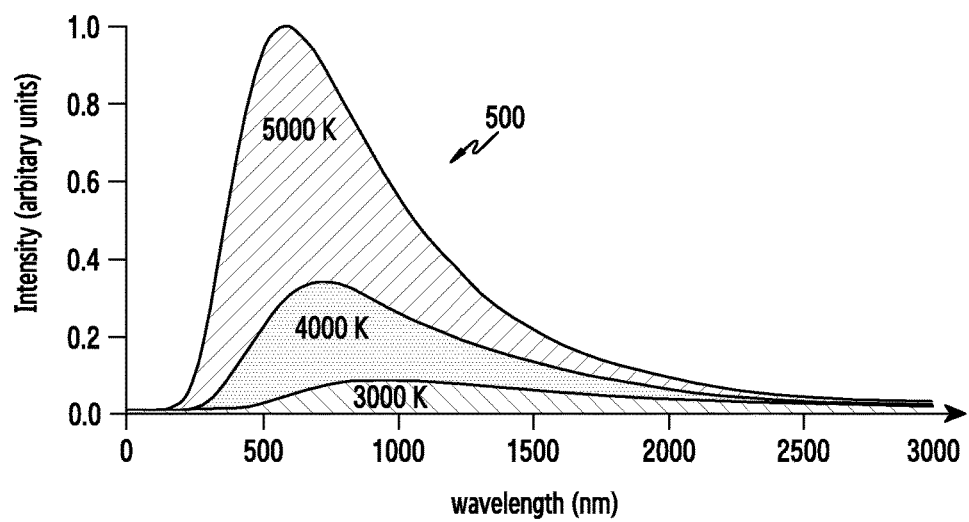
FIG. 5 is a graph illustrating an example of a radiation spectrum based on each color temperature according to various embodiments of the present disclosure.

FIG. 5 is a graph illustrating an example of a radiation spectrum based on each color temperature according to various embodiments of the present disclosure. The color temperature has a spectral radiative rate curve of an ideal black body radiator and corresponds to the absolute temperature of a color light generated by adding the absolute temperature 273° C. and the temperature in Celsius of the black body, which uses K (Kelvin) corresponding to the display unit. The color temperature has a blue color as the temperature becomes higher and has a red color as the temperature becomes lower. For example, the color temperature of 2200 K may correspond a light color of a candle, the color temperature of 3000 K may correspond to a silver-white color fluorescent lamp or a high temperature sodium lamp, the color temperature of 4000 K may correspond to a white color fluorescent lamp, a warm white color fluorescent lamp, or a halogen lamp, the color temperature of 5800 K may correspond to a cool white color fluorescent lamp, and the color temperature of 7000 K may correspond to a light source type such as a daylight color fluorescent lamp or a mercury lamp.

Referring to FIG. 5, it is noted that, the lower the color temperature 500, the weaker the light intensity and the longer the light wavelength. For example, the light intensity of the white color fluorescent lamp of the color temperature 4000 K is stronger than the light intensity of the silver-white color fluorescent lamp of the color temperature 3000 K, and the light wavelength of the white color fluorescent lamp of the color temperature 4000 K is shorter than the light wavelength of the silver-white color fluorescent lamp of the color temperature 3000 K.

Figure 6:
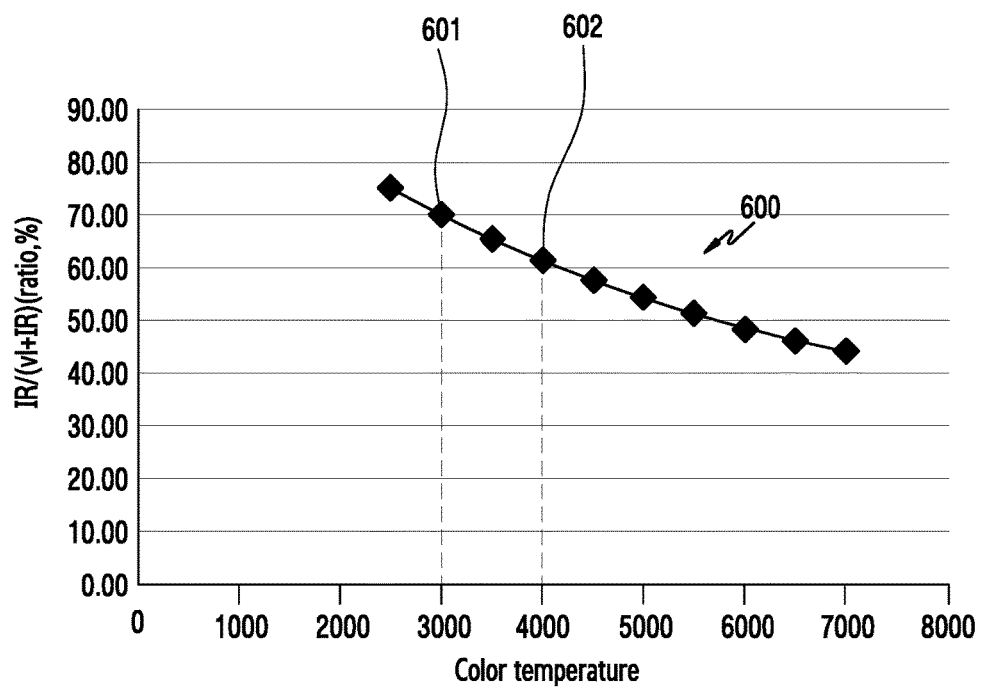
FIG. 6 is a graph illustrating an example of a correlation curve between a color temperature and a light source classification ratio according to various embodiments of the present disclosure.

FIG. 6 is a graph illustrating an example of a correlation curve between color temperature and light source classification ratio according to various embodiments of the present disclosure. The correlation curve corresponds to a result value of an experiment implemented in advance and may be pre-stored and updated in a non-volatile memory within the electronic device.

Referring to FIG. 6, when the amounts of VL and the IR in an incident light sample are measured by the SLC, the AP may calculate the light source classification ratio (IR/(VL+IR)) corresponding to a percentage value generated by dividing the amount of IR in a given light sample by the sum of the amounts of VL and IR (e.g., VL+IR) in the same light sample.

The AP may generate the correlation curve 600 between the temperature color and the light source classification ratio based on the X axis of the temperature color having different values according to the light source type and the Y-axis of the calculated light source classification ratio (IR/(VL+IR)). The correlation curve 600 may be pre-stored in the non-volatile memory as the result value of the experiment implemented in advance. The light source classification ratio (IR/(VL+IR)) may be lower as IR components are small.

Referring to FIG. 6, when the light source classification ratio (IR/(VL+IR)) corresponds to, for example, 70%, the AP may detect a first point 601 on the correlation curve 600 and acquire 3000 K as the color temperature of the source of the incident light sample. Although in this example, light source classification is performed based on the amounts of visible light and infrared light that are present in a sample of incident light, any other suitable type of spectral component of the sample can be used instead or in addition (e.g., ultraviolet light component).

Since the color temperature 3000 K is a color temperature corresponding to, for example, the silver white color fluorescent lamp or the high-temperature sodium lamp, the AP may determine that the current light source type corresponds to the silver white color fluorescent lamp or the high-temperature sodium lamp of the color temperature 3000 K while a camera photography operation is performed.

Referring to FIG. 6, when the light source classification ratio (IR/(VL+IR)) of a given light sample corresponds to, for example, 60%, the AP may detect a second point 602 on the correlation curve 600 and identify 4000 K as the color temperature of the light source associated with the sample.

Since the color temperature 4000 K is a color temperature corresponding to, for example, the white color fluorescent lamp, the warm white color fluorescent lamp, or the halogen lamp, the AP may determine that the current light source type corresponds to the white color fluorescent lamp, the warm white color fluorescent lamp, or the halogen lamp of the color temperature 4000 K while a camera photography operation is performed.

The correlation curve between the color temperature and the light source classification ratio may have the X axis of different color temperatures according to the light source type and may have the Y-axis which is set as the light source classification ratio differently calculated in various ways. For example, the light source classification ratio on the Y-axis may be one of a ratio (IR/VL) generated by dividing the IR by the VL, a ratio (VL/IR) generated by dividing the VL by the IR, a ratio ((VL+IR)/IR) generated by dividing a sum of the VL and the IR by the IR, a ratio (VL/(VL+IR)) generated by dividing the VL by the sum of the VL and the IR, and a ratio ((VL+IR)/VL) generated by dividing the sum of the VL and the IR by the VL.

The AP may calculate the light source classification ratio (for example, IR/VL) on the Y-axis which can be variously set as described above, and acquire the color temperature corresponding to the light source classification ratio (for example, IR/VL) with reference to the correlation curve, so as to determine the light source type corresponding to the acquired color temperature.

FIG. 7 is a diagram of an example of a gain adjustment table, according to various embodiments of the present disclosure. Referring to FIG. 7, the gain adjustment table 700 may be stored in the non-volatile memory of the electronic device, and it may include a plurality of rows. For each row of the gain adjustment table 700 may include a color temperature field and a corresponding light source type field. Additionally or alternatively, the gain adjustment table 700 may include an AWB gain control value field and the like.

When the color temperature acquired with reference to the correlation curve 600 of FIG. 6 is, for example, 4000 K, the AP may determine that the light source type corresponding to the color temperature 4000 K corresponds to a white color fluorescent lamp, a warm white color fluorescent lamp, a halogen lamp, or the like with reference to the gain adjustment table 700 of FIG. 7. When the color temperature acquired with reference to the correlation curve 600 of FIG. 6 is, for example, 3000K, the AP may determine that the light source type corresponding to the color temperature 3000K corresponds to a silver white color fluorescent lamp or a high-temperature sodium lamp, or the like with reference to the gain adjustment table 700 of FIG. 7.

The AP may determine the light source type according to each color temperature as described above, and more accurately control the AWB by applying an optimal AWB gain control value to the current light source type with reference to the AWB gain control value (for example, R/G/B gain #) included in the determination information 700. The AWB gain control value may be pre-stored as a result value of an experiment implemented in advance or stored and updated in various ways through a user interface or a communication interface. Although in the present example a gain adjustment table is used to relate light source type to different gain control values (for adjusting white balance), it can be readily appreciate that any other suitable type of data structure can be used (e.g., a graph, etc.). Additionally or alternatively, an algorithm or equation for identifying different gain control values based on light source type may be instead stored in the memory of the electronic device. Moreover, although in the present example, one or more gain adjustment values are related to different light source types, in some implementations the gain adjustment values can be directly related to different amounts of VL and/or VR (or corresponding ratio thereof) that are measured in a given light sample.

Figure 8:
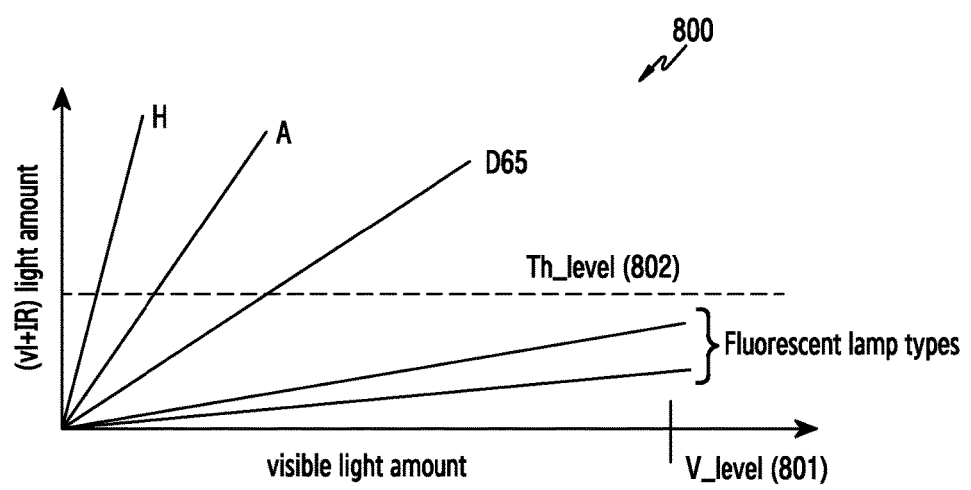
FIG. 8 is a graph illustrating an example of infrared light and visible light distribution characteristics depending on light source, according to various embodiments of the present disclosure.

FIG. 8 is a graph illustrating an example of infrared light and visible light distribution characteristics depending on light source, according to various embodiments of the present disclosure. Referring to FIG. 8, a graph 800 identifies infrared light and visible light characteristics that correspond to various types of light sources such as, for example, fluorescent lamp types, outdoor natural light of about 6500 K (D65), an incandescent lamp (A), and a horizon light (H). The X-axis of the graph 800 corresponds to an amount of VL in a given sample, and the Y-axis of the graph 800 may correspond to the sum (VL+IR) for the given sample.

The fluorescent lamp types, the outdoor natural light of about 6500 K (D65), the incandescent lamp (A), and the horizontal light (H) are arranged in an order of the light source from a high color temperature to a low color temperature. For example, the fluorescent lamp types correspond to a light source having a higher color temperature than that of the horizontal light (H), and does not exceed a reference light amount (Th_level) 802 set based on the infrared component before the light amount of the VL exceeds a preset reference light amount (V_level) 801.

The horizontal light (H) corresponds to a light source having a lower color temperature than that of the fluorescent lamp types, and exceeds the reference light amount (Th_level) 802 set based on the infrared component even before the light amount of the VL exceeds the preset reference light amount (V_level) 801. That is, the fluorescent lamp types having the high color temperature have small infrared components and the horizontal light (H) having the low color temperature has large infrared components. The AP may determine the light source of the graph having a smallest infrared light increase amount compared to a visible light increase amount as the fluorescent lamp type in consideration of the characteristics, and sequentially determine the outdoor natural light, the incandescent lamp, and the horizontal light.

Since the AP may determine the light source type through such a method, when the camera photographs a single color subject, white balance errors in which the original subject color is identified as the light source color and thus the subject color is processed as a complementary color different from the original color may be prevented. For example, the camera photographs a green tree at sunset, it is possible to effectively prevent a color of the green tree from being distorted (for example, becoming bluish). In a self-portrait mode, when a user's face is considerably within an angle of view (for example, FIG. 1B), it is possible to effectively prevent a white balance error generated because a skin color of the face is a single color.

Figure 9:
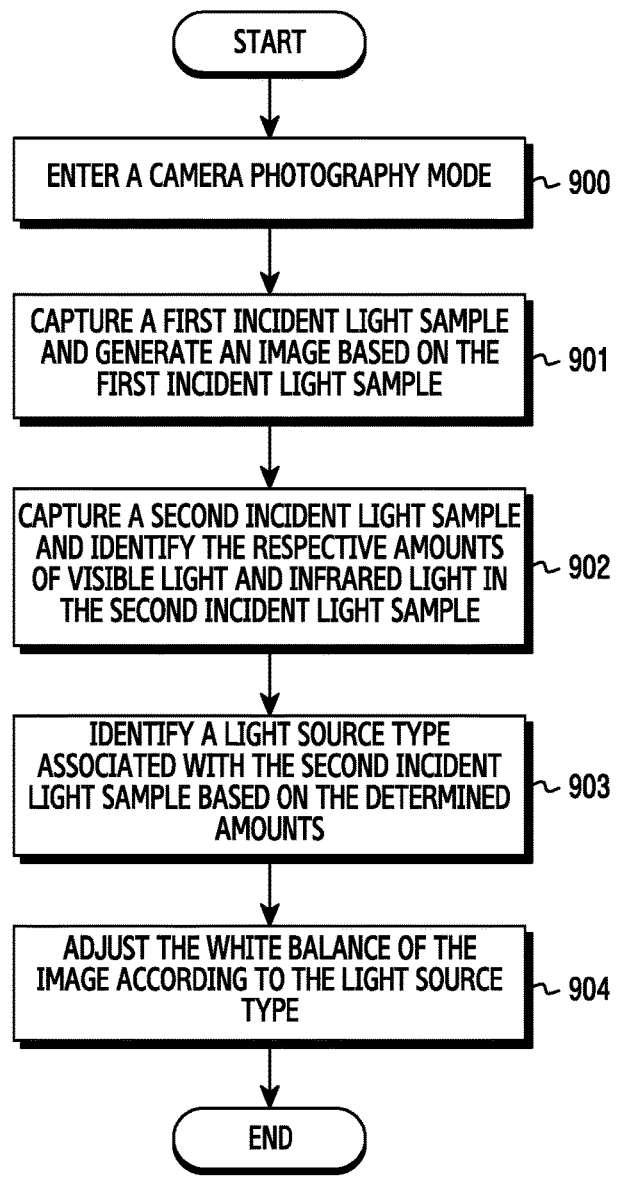
FIG. 9 is a flowchart of an example of a process, according to various embodiments of the present disclosure.

FIG. 9 is a flowchart of an example of a process, according to various embodiments of the present disclosure. As illustrated, the electronic device may enter a camera photography mode in response to a user's request in operation 900. The electronic device may convert a first incident light sample into an image by using the image sensor of the camera module in operation 901, and identify the amounts of VL and IR in a second incident light sample that is captured using the SLC in operation 902.

In operation 903, the AP of the electronic device may determine a light source type of the incident light based on the identified amounts of VL and IR in the second light sample, and adjust the white balance according to the determined light source type in operation 904. The detailed description of each of the operations has been made in detail with reference to FIGS. 3 to 8.

Figure 10:
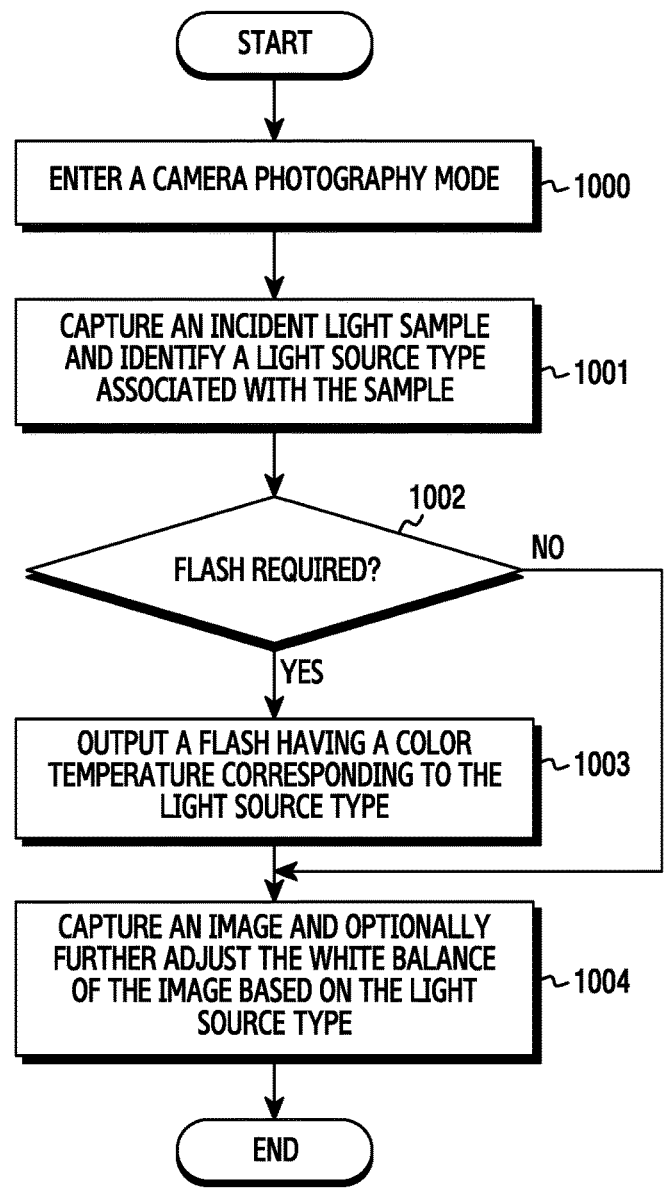
FIG. 10 is a flowchart of an example of a process, according to various embodiments of the present disclosure.

FIG. 10 is a flowchart of an example of a process, according to various embodiments of the present disclosure. As illustrated, the electronic device may enter into a camera photography mode in response to a user's request in operation 1000.

In operation 1001, the electronic device may then identify the amounts of VL and IR that are present in an incident light sample and determine a light source type that is associated with the sample. The light sample may be captured by using an SLC that is orientated in the same direction as an imaging sensor of the electronic device. In operation 1004, the electronic device may capture an image and then perform a white balance adjustment operation according to the light source type to control the white balance according to the determined light source type.

In some implementations, when light emission of a flash is required in operation 1002, the electronic device may identify a color temperature corresponding to the current light source type and then emit a flash having a color that is selected based on the color of the current light source, light in operation 1003. For example, when the current light source type corresponds to the white color fluorescent lamp of the color temperature 4000 K in the electronic device such as the smartphone in a state where a first flash and a second flash are installed, a color temperature of a light source of the first flash is 3000 K, and a color temperature of a light source of the second flash is 4000 K, the electronic device selects and makes the second flash of the color temperature 4000 K emit a light. Accordingly, due to the light emission from the flash, it is possible to efficiently prevent a color of a subject from being distorted.

According to various embodiments of the present disclosure, a method of operating an electronic device may include: converting a first incident light into an image; classifying a second incident light into different light; determining a light source type of the second incident light based on the classified light; and controlling white balance of the image according to the light source type.

The determining of the light source type may include determining an ambient light source by using ratios of two or more of whole light, a visible light, an infrared light, and an ultraviolet light classified by a sensor of light classification, and the sensor of light classification may be manufactured as a module including at least one of an illumination sensor, a proximity sensor, a Red-Green-Blue (RGB) sensor, a Time Of Flight (TOF) sensor, an Infrared (IR) sensor, and an image sensor.

The determining of the light source type may include determining the light source type of the second incident light based on at least one of a ratio generated by dividing an Infrared Light (IR) classified by a sensor of light classification by a sum (VL+IR) of a Visible Light (VL) and the IR, a ratio generated by dividing the IR by the VL, a ratio generated by diving the dividing the VL by the IR, a ratio generated by dividing the sum of the VL and the IR by the IR, a ratio generated by dividing the VL by the sum of the VL and the IR, and a ratio generated by dividing the sum of the VL and the IR by the VL.

The determining of the light source type may include acquiring a color temperature of the incident light based on at least one of the ratios and determining the light source type of the second incident light based on the color temperature, and further include storing reference information for acquiring the color temperature and determining the light source type. The reference information may correspond to information in which a color temperature and a light source type corresponding to at least one of the ratios are connected, and may be stored in at least one of a graph form, a lookup table form, an algorithm form, and a calculation equation form.

A first image sensor and a first sensor of light classification may be disposed on a front surface of the electronic device and a second image sensor and a second sensor of light classification may be disposed on a rear surface of the electronic device. The method may further include selecting and operating one sensor of light classification disposed on an equal surface to that of one image sensor, which is currently operating, or disposed on an opposite surface, or operating all of the first sensor of light classification and the second sensor of light classification. The electronic device may include two or more flashes having different color temperatures, and the method may further include making a flash corresponding to the color temperature of the light source type emit a light.

According to various embodiments of the present disclosure, an electronic device may include: an image sensor for converting a first incident light into an image; a sensor of light classification for classifying a second incident light into different light; and a processor for determining a light source type of the second incident light based on the classified light and controlling white balance of the image according to the light source type.

The processor may determine an ambient light source by using ratios of two or more of whole light, a visible light, an infrared light, and an ultraviolet light classified by a sensor of light classification, and the sensor of light classification may be manufactured as a module including at least one of an illumination sensor, a proximity sensor, an RGB sensor, a TOF sensor, an IR sensor, and an image sensor.

The processor may determine the light source type of the second incident light based on at least one of a ratio generated by dividing an Infrared Light (IR) classified by a sensor of light classification by a sum (VL+IR) of a Visible Light (VL) and the IR, a ratio generated by dividing the IR by the VL, a ratio generated by diving the dividing the VL by the IR, a ratio generated by dividing the sum of the VL and the IR by the IR, a ratio generated by dividing the VL by the sum of the VL and the IR, and a ratio generated by dividing the sum of the VL and the IR by the VL.

The processor may acquire a color temperature of the incident light based on at least one of the ratios and determine the light source type of the second incident light based on the color temperature, and may further include a memory for storing reference information for acquiring the color temperature and determining the light source type. The reference information may correspond to information in which a color temperature and a light source type corresponding to at least one of the ratios are connected, and may be stored in at least one of a graph form, a lookup table form, an algorithm form, and a calculation equation form.

A first image sensor and a first sensor of light classification may be disposed on a front surface of the electronic device and a second image sensor and a second sensor of light classification may be disposed on a rear surface of the electronic device. The processor may select and operate one sensor of light classification disposed on an equal surface to that of one image sensor, which is currently operating, or disposed on an opposite surface, or operate all of the first sensor of light classification and the second sensor of light classification.

FIGS. 1-10 are provided as an example only. At least some of the operations discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples. It will further be understood that the phrase "incident light sample" may refer to a sample of light that is incident on a sensor taking the sample and/or a sample of light that is incident on an imaging sensor.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. A portable communication device comprising:
a light sensor to detect visible light and infrared light from incident light;
an image sensor to capture an image; and
a processor configured to:
identify a first amount of the visible light and a second amount of the infrared light using the light sensor;
identify a color temperature corresponding to the incident light based at least in part on the first amount and the second amount; and
generate the image using the image sensor, the generating including performing a white balance function based at least in part on the identified color temperature.

2. The portable communication device of claim 1, wherein the light sensor is configured to identify a first portion of the incident light as the visible light based at least in part on a determination that a wavelength of the first portion corresponds to a first range and a second portion of the incident light as the infrared light based at least in part on a determination that a wavelength of the second portion corresponds to a second range.

3. The portable communication device of claim 1, wherein the light sensor includes a first sensor corresponding to the visible light and a second sensor corresponding to the infrared light.

4. The portable communication device of claim 1, wherein the light sensor includes at least one of an RGB sensor, a TOF (time of flight) sensor, an ultraviolet sensor, an infrared sensor, an iris sensor, an illumination sensor and a proximity sensor, another image sensor, or any combination thereof.

5. The portable communication device of claim 1, wherein the light sensor and the image sensor are disposed on a same side of the portable communication device.

6. The portable communication device of claim 1, wherein the processor is further configured to:
identify an auto white balance (AWB) gain control value corresponding to the identified color temperature, and
perform the white balance function based at least in part on the identified AWB gain control value.

7. The portable communication device of claim 1, wherein the processor is adapted to:
determine a ratio between the visible light and the infrared light based at least in part on the first amount and the second amount; and
perform the identifying of the color temperature based at least in part on the ratio.

8. The portable communication device of claim 7, wherein the ratio includes: a ratio of a first amount of the visible light to a second amount of the infrared light, a ratio of the second amount to the first amount, a ratio of the first amount to a sum of the first amount and the second amount, a ratio of the second amount to the sum, a ratio of the sum to the first amount, a ratio of the sum to the second amount, a ratio of the first amount to a third amount of the incident light, a ratio of the second amount to the third amount, a ratio of the third amount to the first amount, a ratio of the third amount to the second amount, or any combination thereof.

9. A portable communication device comprising:
a light sensor to detect visible light and infrared light from incident light;
an image sensor to capture one or more images;
a processor configured to:
generate a first image using the image sensor, the generating of the first image including performing a white balance function;
identify a first amount of the visible light and a second amount of the infrared light using the light sensor;
identify a color temperature corresponding to the incident light based at least in part on the first amount and the second amount; and
generate a second image using the image sensor, the generating of the second image including adjusting the white balance function based at least in part on the identified color temperature.

10. The portable communication device of claim 9, wherein the first amount and the second amount is identified while the one or more images are generated using the image sensor.

11. The portable communication device of claim 9, wherein the processor is further configured to:
prior to generating of the first image, identify other amounts of another visible light and another infrared light using the image sensor or light sensor;
identify another color temperature corresponding to another incident light based on the other amounts of the other visible light and the other infrared light; and
perform the generating the first image based at least in part on the other color temperature.

12. The portable communication device of claim 11, wherein the processor is further configured to:
set the white balance function based at least in part on the other color temperature.

13. The portable communication device of claim 9, wherein the processor is further configured to:
determine a ratio between the visible light and the infrared light based at least in part on the first amount and the second amount; and
perform the identifying of the color temperature based at least in part on the ratio.

14. The portable communication device of claim 9, wherein the processor is further configured to:
perform a first white balancing operation with respect to the image, as at least part of the performing of the white balance function; and
perform of a second white balancing operation with respect to the second image based at least in part on the color temperature, as at least part of the adjusting of the white balance function.

15. A portable communication device comprising:
a plurality of sensors to receive incident light, the plurality of sensors including a light sensor to detect infrared light from the incident light and an image sensor;
a processor configured to:
identify a first amount of visible light of the incident light using the image sensor;
identify a second amount of the infrared light using the light sensor;
identify a color temperature corresponding to the incident light based at least in part on the first amount and the second amount; and
generate an image using the image sensor, the generating including performing a white balance function based at least in part on the identified color temperature.

16. The portable communication device of claim 15, wherein the processor is further configured to:
determine a ratio between the visible light and the infrared light based at least in part on the first amount and the second amount; and
perform the identifying of the color temperature based at least in part on the ratio.

17. The portable communication device of claim 16, wherein the ratio includes: a ratio of a first amount of the visible light to a second amount of the infrared light, a ratio of the second amount to the first amount, a ratio of the first amount to a sum of the first amount and the second amount, a ratio of the second amount to the sum, a ratio of the sum to the first amount, a ratio of the sum to the second amount, a ratio of the first amount to a third amount of the incident light, a ratio of the second amount to the third amount, a ratio of the third amount to the first amount, a ratio of the third amount to the second amount, or any combination thereof.

18. The portable communication device of claim 15, wherein the processor is further configured to:
identify an auto white balance (AWB) gain control value corresponding to the identified color temperature, and
perform the white balance function based at least in part on the identified AWB gain control value.

\* \* \* \* \*